Figure 1:
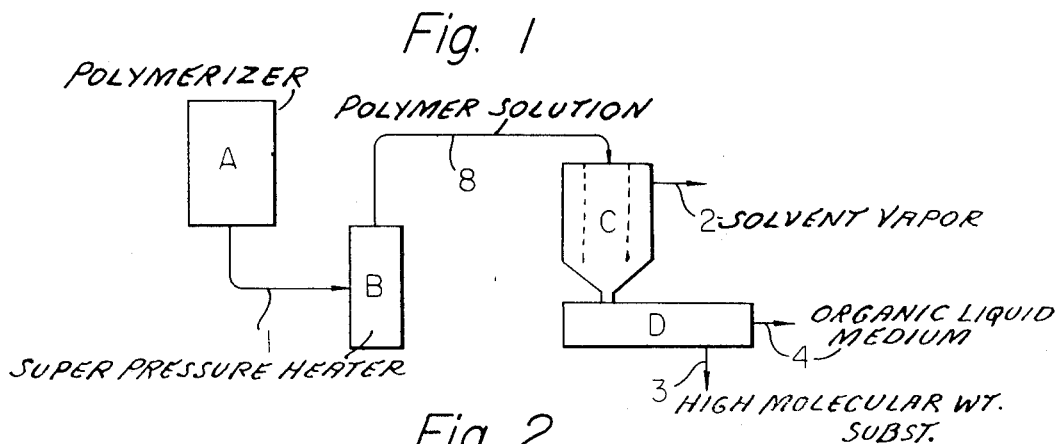

United States Patent

[11] 3,586,089

| [72] | Inventors | Motoo Mato<br>Otake-shi;<br>Tsuyoshi Horiuchi, Iwakuni-shi; Koichi Enomoto; Noboru Saitou, both of Otake-shi, all of, Japan |
|---|---|---|
| [21] | Appl. No. | 725,313 |
| [22] | Filed | Apr. 30, 1968 |
| [45] | Patented | June 22, 1971 |
| [73] | Assignee | Mitsui Petrochemical Industries, Ltd.<br>Tokyo, Japan |
| [32] | Priority | May 2, 1967 |
| [33] | | Japan |
| [31] | | 42/27,693 |

[54] METHOD AND APPARATUS FOR SEPARATING AND DRYING ORGANIC HIGH MOLECULAR WEIGHT SUBSTANCES
4 Claims, 2 Drawing Figs.

[52] U.S. Cl. .................................................. 159/2, 159/48, 159/3
[51] Int. Cl. ........................................... B01d 1/16, B01d 1/18
[50] Field of Search .......................................... 159/2 E, 13 A, 213, 13 B, DIG. 10, 49, 6 W; 264/12, 13; 18/2 TF; 159/48, 3

[56] References Cited
UNITED STATES PATENTS

| 2,731,081 | 1/1956 | Mayner | 159/49 |
| 2,753,594 | 7/1956 | Buck | 18/8 |
| 2,857,962 | 10/1958 | Rogers | 159/6 W |
| 3,067,812 | 12/1962 | Latinen et al. | 159/6 W |
| 2,992,679 | 7/1961 | Twaddle | 159/2 E |
| 3,149,056 | 9/1964 | Longstreth et al. | 159/13 AX |
| 3,201,365 | 8/1965 | Charlesworth et al. | 260/34.2 |
| 3,244,601 | 4/1966 | Diedrich | 159/13 A |

FOREIGN PATENTS

| 685,246 | 4/1964 | Canada | 159/2 E |

Primary Examiner—Samih N. Zaharna
Assistant Examiner—J. Sofer
Attorney—Sherman and Shalloway ABSTRACT: Improved method of separating a high molecular weight substance from a viscous liquid thereof, which comprises flashing said viscous liquid into a flashing zone from above via a partitioned baffle passage in said zone to cause said organic high molecular weight substance to adhere to said passage, from whence the high molecular weight substance is caused to drop to the bottom of the flash-drying tank along the inner wall of the baffle passage by means of gravity and the air pressure of the flash stream, and thereafter withdrawing the high molecular weight substance from the lower part of the flashing zone and, on the other hand, also withdrawing from the flashing zone said liquid medium which has been transformed into the vapor phase, and flash-drying apparatus suitable for practicing the method.

METHOD AND APPARATUS FOR SEPARATING AND DRYING ORGANIC HIGH MOLECULAR WEIGHT SUBSTANCES

This invention relates to a method of separating dry polymers from a viscous liquid of organic high molecular weight substances, especially a synthetic organic polymeric solution; and to a flash-drying apparatus suitable for practicing the method.

Lately, various kinds of synthetic resins and synthetic rubbers are being produced commercially by polymerizing or copolymerizing the olefins and/or diolefins, using the Ziegler-type catalysts.

These polymers or copolymers (hereinafter may be referred to as merely polymers) are produced by the solution polymerization method using as the reaction medium the organic liquid media such as hydrocarbons. Since the resulting polymerization reaction product is obtained in a state wherein the polymers are either in solution in the organic liquid medium or in suspension therein (may be used herein to include the swelled state), an operation to separate the polymers from the medium becomes necessary.

When the polymers hardly dissolve or swell in the medium, they can be separated by filtration, but when the solubility of the polymers in the medium is great, considerable difficulty is involved in their separation from the medium. It was particularly difficult to separate the polymer from the solution in the case of the synthetic rubber solution obtained by the solution polymerization method.

Two procedures were practiced heretofore in separating and collecting the polymer from a polymeric solution. First, there was a method which consists of blowing steam directly into the polymeric solution to remove the solvent by means of the steam distillation principle, thereby rendering the polymer into water and a slurry, and thereafter separating the polymer by filtration followed by drying the polymer. Secondly, there was a method which consists of heating the polymeric solution in its solution state to thereby effect the direct removal of the solvent and drying of the polymer.

The first method requires the two steps of separating the solvent and of separating the water from the slurry. It is thus a disadvantage from the standpoint of operations and equipment required. Hence, it is also costly. On the other hand, in the second method it is possible to carry out the removal of the solvent and the drying in a single step. Hence, it is more favorable than the first method in respect of the operations and equipment required as well as costs. In actual practice, however, it is not so simple. For example, in the case of a solution polymerization product of synthetic rubber, if by heating the solution and removing the solvent it is concentrated to 200 percent to 300 percent (dry weight basis), the solution becomes very viscous to make the further removal of the solvent difficult by mere heating. Hence, it becomes necessary to complete the removal of the solvent by some other supplementary means.

Therefore, as a proposal for carrying out the solvent removal by the second method, one has been made wherein the solvent removal is completed by carrying out the solvent removal by not just mere heating of the polymeric solution but by the addition of flash drying, and further by extruding the resulting polymeric powder containing a minor amount of solvent through a screw extruder dryer while masticating it (British Pat. No. 824,240).

It was found, however, that there were other bottlenecks in this proposal. One of the most fatal defects was that while in this proposal the so-called flash-drying technique is employed, wherein the solvent is evaporated by introducing the heated polymeric solvent into the flashing zone while reducing its pressure, in the usual flash dryers the drying is incomplete when the flash temperature is in the neighborhood of the melting point of the polymer, or lower, with the consequence that much solvent remains behind and hence imposing a great solvent removal load on the subsequent kneading operations by means of such as the extruder.

Further, such operational difficulties as ventup are involved and, as a consequence, it becomes necessary to use complicated and costly apparatus.

On the other hand, the flashing temperature can be raised for ensuring a more complete solvent removal by means of flashing, but then the sticky polymer adheres to the inside walls of the flash drier to make the subsequent transfer of the polymer very difficult. Further, the entrainment of the wet polymeric powder by the stream of solvent vapor contaminates the apparatus and especially causes obstruction of the apparatus to render the continuance of the operation impossible. Hence, it becomes necessary to stop the operations frequently and engage in the operation of clearing the obstruction.

An object of this invention is to provide a method wherein the operational bottlenecks in the aforesaid second method having been overcome the organic high molecular weight substances and the liquid medium are separately separated from the viscous liquid of the organic high molecular weight substances in an exceedingly advantageous manner from the standpoint of operations and equipment requirement, as well as from the standpoint of such as labor, power consumption, cost and spaced occupied.

Another object is to provide an improved flash-drying apparatus for accomplishing the above-described separation.

Other objects and advantages of the invention will become apparent from the following description.

The foregoing objects of this invention can be achieved in the following manner. In the method of separating from a viscous liquid of an organic high molecular weight substance said substance, and drying the same by the flash-drying treatment of said viscous liquid comprising an organic high molecular weight substance in solution or suspension in an organic liquid medium, said viscous liquid having a quantity of heat at least sufficient that the total medium can be transformed into the vapor phase under flash-drying conditions and a viscosity of not over 10,000 centipoises, preferably 100 — 1000 centipoises, to separate the organic high molecular weight substance from said liquid medium, the aforesaid viscous liquid is flashed into a flashing zone from above via a partitioned baffle passage in said zone whose temperature is preferably less than the melting point of the high molecular weight substance, to cause said organic high molecular weight substance to adhere to the wall of said baffle passage, from whence the high molecular weight substance is caused to drop to the bottom of the flash-drying tank along the inner wall of the baffle passage by means of gravity and the dynamic pressure the flash stream, after which the high molecular weight substance is withdrawn from the lower part of the flashing zone while, on the other hand, said liquid medium which has been transformed into the vapor phase is also withdrawn from the flashing zone. Thus, the organic high molecular weight substance is separated from the viscous liquid in which it was in solution or suspension and dried.

The invention apparatus must be used for practicing this method, since the conventional apparatus is not suitable.

In a flash-drying apparatus for separating from a viscous liquid of an organic high molecular weight substance, said high molecular weight substance and the organic liquid medium, which apparatus has at least one flashing nozzle disposed at the top of a flash-drying tank and adapted to flash towards the bottom of said tank a liquid comprising an organic high molecular weight substance in solution or suspension in an organic liquid medium, preferably a solution of synthetic rubber such, for example, as an ethylene-propylene-diolefin terpolymer; a discharge outlet at the bottom of said tank for the organic high molecular weight substance from which the organic liquid has been removed, and a discharge outlet at the top of said tank for the vapor of said medium; the invention apparatus is characterized in that a. it is provided with a baffle tube surrounding said flashing nozzle for causing the organic high molecular weight substance to be strippably adhered to the inner wall of the tube to form an aggregate mass;

b. the distal end of the prolonged portion of said tube opens facing towards the bottom of said tank, the tube is positioned apart from the inner periphery of the side wall of the flash-drying tank, and the inner wall of said tube is preferably lined with a fluorine resin; and c. the vent for the vapor of the said medium is provided in the tank wall at a point higher than the position at which the distal end of the prolonged portion of said tube opens.

For a better understanding, the invention method will be further illustrated by means of the accompanying drawing; wherein, FIG. 1 is a process chart illustrating a typical mode of practicing the invention method, inclusive of the polymerization step.

Figure 2:
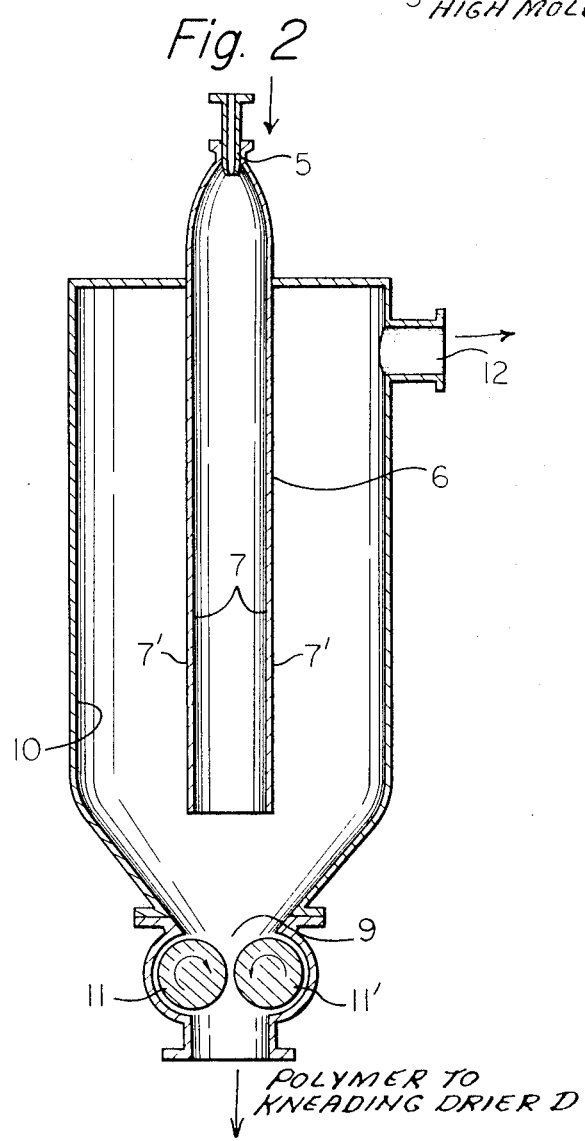

FIG. 2 is a schematic view in section illustrating a baffle tube-equipped flash drier suitable for practicing the invention method.

In FIG. 1 the polymeric solution containing the polymer, after leaving the polymerization vessel A, is introduced via line 1 to a heating unit B where it is heated. After heating, the polymeric solution is charged via line 8 to a flash drier C having a baffle tube 6 such as shown by way of example in FIG. 2. Here the solvent vaporizes and is recovered via line 2, while the polymer adheres to the inner periphery of the baffle tube, which is disposed inside the flash drier and satisfies the hereinbefore noted requisites (a) and (b). The particles of the polymer which have adhered to the inner periphery of the tube adhere to each other and grow to form an aggregate mass. This aggregate mass separates from the inner periphery of the tube by means of gravity and the dynamic pressure of the flash stream and drops to the bottom of the tank, from whence it is discharged via the discharge outlet for the high molecular weight substance and is recovered.

The discharge outlet for the high molecular weight substance is preferably provided with a pair of forwarding rolls. In addition, it is preferred that this discharge outlet is connected with either a vent extruder or a kneading-type drier D for accomplishing the further removal of the minor amount of the organic liquid medium via line 4 which might possibly remain in the high molecular weight substance that has been withdrawn from the flashing zone, the high molecular weight substance being removed thru line 3.

The polymeric solution containing the polymer leaving the polymerization vessel A may, if necessary, be submitted prior to its entry into the heating unit B to the steps of filtration or of washing and purification by means of such as water, alkalis or acids for the purpose of removing the catalyst. Further, the addition to the polymer of the various additives such, for example, as carbon black for synthetic rubber and the various stabilizers can be made in advance at this stage. Further, in those cases where due to such as the solubility of the polymer in the solvent or the configuration of the polymer, the polymer does not exist in a complete state of solution and a part of the solvent is mechanically separable, the polymeric solution may be conveyed to the heating unit B after having first mechanically separated this part.

Heating unit B, which is the apparatus for heating the polymeric solution in the liquid phase under superatmospheric pressure, imparts a quantity of heat to the solution which is sufficient to transform the whole of the solvent to vapor when the solution is flashed. While the temperature and pressure will vary depending upon the class of solvent, for example, when hexane has been used, the pressure usually range from 20 to 40 kg./cm.$^2$ while the temperature usually ranges from 150° to 250° C. The liquid phase heating can be carried out even when the solution has a viscosity of up to about 10,000 centipoises, but it usually preferred to handle it as a polymeric solution having a viscosity of about 100 to 1,000 centipoises. Usually, those of the heat-exchanging type are best used as this unit B. And for ensuring that the quality of the polymer is maintained in a satisfactory state, it is preferred to operate with a dwell time of not more than 10 minutes. Further, it is preferably operated at a lineal speed of at least 0.3 meter per minute for preventing the soiling of the heat transfer surface.

The flash-drying tank is a most important apparatus in this invention, for it is the apparatus which roughly separates the polymer from the solvent by flashing the solution, which has been heated at the heating unit, while reducing its pressure. FIG. 2 illustrates a typical example of this apparatus. In FIG. 2 the polymeric solution is first flashed at a flash nozzle 5 and, as a result of the solvent having evaporated, the polymer from which the solvent has been removed adheres to the inner wall 7 of a baffle tube 6. While it is possible to raise the temperature of the baffle tube inner wall to above the melting temperature of the polymer and cause the solvent-removed polymer to adhere to said inner wall in a molten state, the usual practice is to operate with the temperature inside the flash drier at below the melting temperature of the polymer and cause the polymer to deposit and adhere to the wall as a solid. It is necessary to make the pressure inside the flash drier lower than that of the heating unit. While the flashing is carried out usually at normal atmospheric pressure, reduced pressure or a state in which the pressure is slightly higher than normal atmospheric pressure can also be used. The diameter of the baffle tube 6 is preferably so chosen that the velocity of the solvent vapor ranges from 1 to 20 meters per second. When only one flashing nozzle is used, only one baffle being necessary, the construction becomes a so-called double-tube construction, as shown in FIG. 2. However, the number of baffle tubes can be increased to two or more in accordance with the number of nozzle used. When the polymer has been caused to separate and adhere as a solid, the polymer which has separated and adhered to the inner wall of the baffle tube gradually increases in amount and forms an aggregate mass, which upon being suitably subjected to dynamic pressure of the flash stream or by means of gravity flake off and drop to the bottom of slashing zone. FIG. 2 illustrates an embodiment which has been provided with a pair of rolls 11, 11' at the discharge outlet for the high molecular weight substance. Since, in contradistinction to the case of the conventional apparatus without the baffle tube, the polymer particles have adhered and collected together, the polymer flakes off from the baffle tube as massy flakes of about 1 to 10 cm. in diameter. Hence, the separation of the vapor of the organic liquid medium from the polymer is carried out very smoothly. Namely, when the vapor stream turns its direction upwardly at the opening of distal end of the prolongation of the baffle tube, there is practically no entrainment of the polymer. As a result, there is no possibility that the baffle tube outer surface 7', the inner peripheral wall 10 of the tank, and further the vapor vent pipe 12 will be contaminated or obstructed by the polymer, and hence the operation can be carried out smoothly. The solvent content of the polymer which has cropped onto the rolls 11, 11' is of the order of 5 percent to 10 percent by weight, and this solvent content can be freely adjusted. This solvent content is preferably decided suitably taking into consideration such as the class of the polymer, the final solvent-removal method, the quality maintenance desired and economy. In this flash drier, the degree of smoothness of the baffle tube wall and its adhesive property is adjustable as required. Namely, when the solid polymer is caused to be deposited on the inner wall of the baffle tube in this invention, it is an advantage to see to it that the adhesion of the minute particles is set up forcibly and after their adhesion in a suitable amount followed by growth that their stripping takes place. If the polymer does not adhere to the inner wall of the baffle tube at all, a substantial amount of the polymer particles will become entrained by the solvent vapor issuing from the baffle tube in their still fine particulate state and hence will not drop onto the rolls at the bottom of the tank. On the other hand, if the adhesion is too firm, there is the possibility that the baffle tube would become obstructed. Hence, it is to be desired that for obtaining a suitable state of adhesion in accordance with the polymer used the degree of smoothness (or roughness) of the inner wall surface and/or the material with which is made be chosen in accordance with experimental determinations made in advance. For example, in the case of the solution of polyethylene polymerized by the so-called medium pressure method using a metal oxide catalyst whose melt viscosity of the polymer is relatively low, the wall surface may be of the order of "high finish" (JIS B-0601 VVV), but in or case of those whose melt viscosity is high, such as synthetic rubber, the inner wall surface is best made smooth and difficult to adhere to by coating or lining it with a fluorine resin such, for example, as polytetrafluoroethylene, the copolymer of tetrafluoroethylene and hexafluoropropylene, and polytrifluorochlorethylene, or the other substances having the property of being difficulty adhered to; or alternatively by application of a glass lining to the inner wall. When a baffle tube having an inner wall surface suited to the adhesiveness of the polymer, such as above described, is used, a greater linear velocity of the vapor between the baffle tube and jacket can be employed. Hence, the invention apparatus can be made much smaller than the conventional spray type apparatus. The polymer obtained by the flash drier of the present invention can, if necessary, be conveyed to either a vent extruder or a kneading type drier for further elimination of any remaining solvent.

A polymeric liquid which is suitable to be removed of its solvent according to the invention method is exemplified by one wherein the polymer is in solution or suspension in the solvent after completion of the polymerization reaction. The invention method is especially suitable for separating and recovering the polymers or copolymers of olefins and diolefins from the liquids in which these polymers or copolymers are in solution or suspension, and inter alia in the case of such synthetic resins as polyethylene and polypropylene which have been prepared by means of the Ziegler-type catalysts, the ethylene-propylene copolymer, the ethylene-propylene-diolefin terpolymer (in which e.g. dicyclopentadiene, 1,4–hexadiene or ethyldiene norbornene is used as the diolefin), and the synthetic rubbers, such as polybutadiene. In particular, most excellent results are demonstrated by the invention method in connection with the separation and recovery of the polymer in the preparation of synthetic rubber. Further, even in the case of the preparation of the synthetic resins such as polyethylene and polypropylene, it is possible to utilize the invention apparatus with advantage by employing an operation wherein a temperature of the flash drier of above the melting temperature of the polymer is used and the solvent-removed polymer is caused to adhere to the inner wall of the baffle tube in a molten state and then dried. Again, the concentration of the polymer in the polymeric solution to be treated, as previously stated, should be governed by the restriction imposed by the heating unit, and usually a concentration of the polymer of a maximum solution viscosity of 10,000 centipoises, and preferably not over 1000 centipoises, is suitable.

EXAMPLE

This example illustrates the instance when the solvent removal of a hexane solution (60 g/l) of an ethylene-propylene dicyclopentadiene terpolymer consisting of 78 percent of ethylene, 20 percent of propylene and 2 percent of dicyclopentadiene was carried out.

The rough specifications of the equipment employed and the operating conditions were as follows:

Flash Drier

Baffle tube: 10 cm.×1 m. [inner wall coated with FEP (tetrafluoroethylene-hexafluoropropylene copolymer)]
Jacket: 30 cm.×1.3 m.
Conditions and Results of Experiment
Account fed of polymeric solution: 660 l/hr.
Temperature and pressure of heating unit outlet: 210° 25 kg./cm.$^2$-G
Dwell time in heating unit: 100 sec.
Internal pressure and temperature of flash drier : 100° normal atm. pressure
Vapor velocity inside baffle tube: 5 m./sec.
Solvent content of polymer at flash drier outlet: 7 wt. percent
Temperature of flash drier outlet: 120° C.

We claim:

1. In a method of separating from a viscous liquid of an organic high molecular weight substance said substance and drying the same by the flash treatment of said viscous liquid comprising an organic high molecular weight substance in solution or suspension in an organic liquid medium, said viscous liquid having a quantity of heat at least sufficient that the total medium can be transformed into the vapor phase under flash drying conditions and a viscosity of not over 10,000 centipoises, to separate the organic high molecular weight substance from said liquid medium, the improvement which comprises flashing said viscous liquid into a flashing zone from above via a partitioned baffle passage in said zone to cause said organic high molecular weight substance to adhere to the inner wall of said baffle passage line with a fluorine resin, from whence the high molecular weight substance is caused to drop to the bottom of the flash-drying tank along said inner wall by means of gravity and the dynamic pressure of the flash stream, and thereafter withdrawing the high molecular weight substance from the lower part of the flashing zone and, on the other hand, also with drawing from the flashing zone said liquid medium which has been transformed into the vapor phase.

2. In a flash-drying apparatus for separating from a viscous liquid of an organic high molecular weight substance, said high molecular weight substance and the organic liquid medium, said apparatus having at least one flashing nozzle disposed at the top of a flash-drying tank and adapted to flash towards the bottom of said tank a liquid comprising an organic high molecular weight substance in solution or suspension in an organic liquid medium, a discharge outlet at the bottom of said tank for withdrawing the organic high molecular weight substance from which the organic medium has been removed, and a discharge outlet at the top of said tank for venting the vapor of said medium, the improvement comprising:
  a. the provision of a baffle tube surrounding said flashing nozzle for causing the organic high molecular weight substance to be strippably adhered to the inner wall of the tube to form an aggregate mass, said inner wall being lined with a fluorine resin;
  b. the distal end of the prolonged portion of said tube opening facing towards the bottom of said tank, the tube being spaced apart from the inner periphery of the sidewall of the flash-drying tank; and
  c. the discharge outlet for the vapor of said medium being disposed in the tank wall at the point higher than the position at which the distal end of the prolonged portion of said tube opens.

3. An apparatus according to claim 2 wherein said discharge outlet for the high molecular weight substance is provided with a pair of forwarding rolls.

4. An apparatus according to claim 2 wherein said discharge outlet for the high molecular weight substance is connected with either a vent extruder or kneading-type drier for further elimination of the minor amount of organic liquid medium which might possibly be still remaining in said substance.